Figure 1:
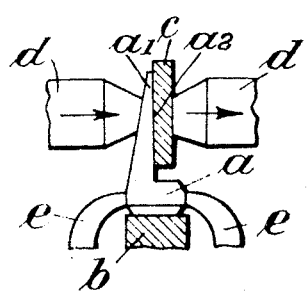

Oct. 7, 1941.  E. MEISNER  2,258,189
METHOD OF JOINING TYPE BLOCKS TO TYPE LEVERS OR TYPE BARS
Filed Dec. 15, 1937

Inventor:
Erich Meisner
by
Franz Reichow
Attorney.

Patented Oct. 7, 1941

2,258,189

UNITED STATES PATENT OFFICE 2,258,189

METHOD OF JOINING TYPE BLOCKS TO TYPE LEVERS OR TYPE BARS

Erich Meisner, Berlin-Schlachtensee, Germany, assignor to Alfred Ransmayer and Albert Rodrian, both of Berlin, Germany, an offene Handelsgesellschaft, partnership Application December 15, 1937, Serial No. 179,914
In Germany January 6, 1937

1 Claim. (Cl. 113—112)

My invention relates to improvements in the method of joining type blocks to type levers or type bars, and in the article produced thereby.

Ordinarily type blocks are fixed to the type levers by riveting or soldering. The object of the improvements is to provide a method in which the type blocks are joined to the said levers or rods by welding. This method might at first sight seem unpracticable, by reason of the high temperature to which the type block must be heated for welding, the tempered types being spoiled by the said heat. In my improved method excessive heating of the character-carrying portion of the block is prevented by joining the block to the type lever or rod by spot welding and so that only a limited part of the block is temporarily heated to welding temperature, the remaining part, and more particularly the part carrying the characters being kept at comparatively low temperature. In the preferred embodiment of the invention provision is made for deflecting the heat from the character-carrying portion of the block, and for this purpose a blast of air or a suitable cooling liquid may be used. But I prefer to deflect the heat by means of solid bodies in contact with the block, and preferably I use type block clamping jaws for thus deflecting the heat, the said jaws being made from a metal of high conductivity such as copper.

Other objects of the improvements will appear from the following description of the invention.

One of the advantages of my improved method is that no soldering metal is needed for joining the type blocks to the levers. Further, no acid soldering medium is needed, so that the type blocks are not subject to rusting. Finally, the types may be hardened by means of chromium.

For the purpose of explaining the invention several forms of type blocks and apparatus for joining the same to a type lever have been illustrated in the accompanying drawing in which the same reference characters have been used in all the views to indicate corresponding parts.

Figure 2:
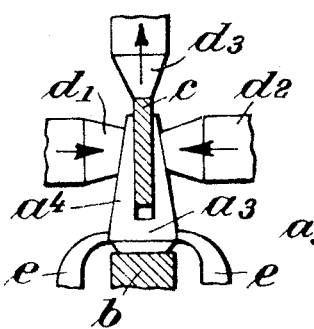
Figure 3:
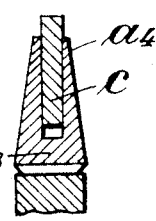
Figure 4:
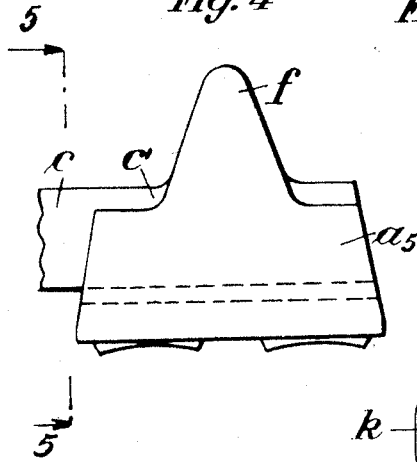
Figure 5:
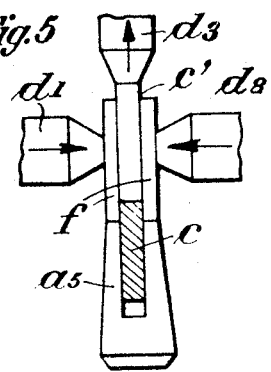
Figure 6:
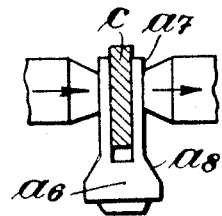
Figure 7:
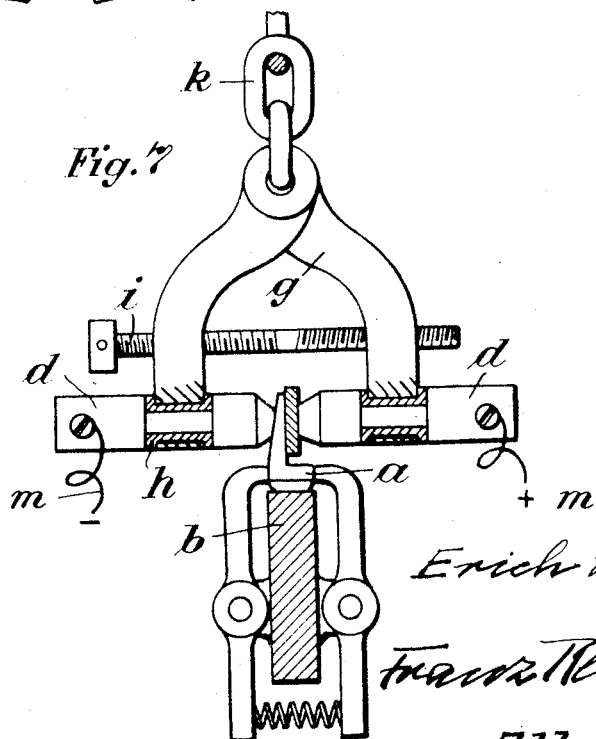

In said drawing:

Fig. 1 is an elevation partly in section showing a type block, a type lever and apparatus for joining the said parts, Fig. 2 is a similar elevation showing a modification, Fig. 3 is a sectional elevation showing in detail the type block and type lever of the example illustrated in Fig. 2, Fig. 4 is an elevation showing a modification, Fig. 5 is a sectional elevation taken on the line 5—5 of Fig. 4, Fig. 6 is a sectional elevation showing another modification, and Fig. 7 is an elevation partly in section showing the welding apparatus and more particularly the device for suspending the welding electrodes.

In the example shown in Fig. 1 the type block comprises a body $a$ and a single rib $a^1$ which is adapted to be united to a type lever or bar $c$. The type block is placed on any known or preferred gauge $b$ for setting the same in proper position relatively to the type lever $c$. Gauges for thus adjusting the type blocks relatively to the type levers are known in the art and I deem it not necessary to describe the same in detail. The block $a$ is held in position on the gauge $b$ by means of a pair of jaws $e$, which preferably are made from a metal of high conductivity for heat such as copper. For joining the rib $a^1$ to the lever or rod $c$ a pair of electrodes $d$, $d$ are provided which force the rib $a^1$ and the type lever into intimate contact. When the electrodes are thus applied under pressure care must be taken that the block $a$ is not displaced on the gauge $b$, and for this purpose the said electrodes are mounted in the manner to be described hereafter.

After the parts have thus been assembled electric current is passed through the electrodes $d$, $d$, the rib $a^1$ and the lever $c$, the said current heating the rib and lever at a comparatively small portion of its surface thus joining the same by spot welding. I have found that by such rapid heating only a comparatively small part of the heat is transmitted to the portion of the block $a$ which carries the characters. The heating of the said character is further reduced by a part of the heat being deflected through the jaws $e$ which are made from a metal of high conductivity.

I have found that by this method the block is securely fixed to the type lever, so that it is not displaced in welding from its adjusted position, and further, that the characters are not softened.

In carrying out the method I prefer to place the block $a$ and the lever $c$ on the gauge so that the vertical welding surface $a^2$ of the rib $a^1$ is slightly shifted towards the right in Fig. 1, so that the middle of the characters is located a few tenths of a millimeter laterally of the middle of the type lever. The surface $a^2$ must always be exactly perpendicular to the front face of the characters. Preferably the bottom part of the type which carries the characters is made thicker than is now usual. Thereby the transmission of heat to the characters is effectively prevented.

It is preferred to grind the surfaces of the type block and the type lever which are to be joined by welding on suitable machines, so that the block and type lever may be assembled without bending the lever.

In Figs. 2 and 3 I have shown a modification in which the type block $a^3$ is formed with two ribs $a^4$, so that it has the usual U-shaped cross-section. The clamping jaws $e$ and the gauge $b$ are similar in construction to the corresponding parts described with reference to Fig. 1. For welding three electrodes $d^1$, $d^2$, and $d^3$ are provided, the electrodes $d^1$ and $d^2$ which bear on the ribs $a^4$ being connected to the same terminal of the source of electric energy, while the electrode $d^3$ is connected to the terminal of opposite polarity of the said source. The electrode $d^3$ engages any suitable part of the type lever. Heating of the portion of the type block which carries the characters is prevented in the same way as in the example described with reference to Fig. 1.

In Fig. 4 I have shown another modification in which heating of the characters is prevented by forming the rib or ribs $a^5$ of the type block with a rearwardly extending nose or noses $f$ corresponding to a similar nose $c'$ formed on the type lever or type rod, the electrodes $d^1$ and $d^2$ engaging the said noses $f$ and $c^1$ as is shown in Fig. 5. Otherwise the method of welding is the same as that described with reference to Figs. 2 and 3.

It will be understood that the method described with reference to Figs. 4 and 5 may also be used in connection with a type block of the construction shown in Fig. 1 in which the block is provided with a single rib $a^1$ and that also the means for preventing the transmission of heat described with reference to Figs. 1 to 3 may be preferably provided.

In the examples described in Figs. 1 to 5 the transmission of heat to the character-carrying portion of the block is comparatively small by reason of the small thickness of the ribs $a^1$.

In Fig. 6 I have shown a modification in which the thickness of the said ribs and therefore the transmission of heat are further reduced. As shown in the said figure, the type block $a^6$ is formed with two ribs $a^7$, which are of even reduced thickness all over the breadth of the type lever $c$, and the walls of the body of the block $a^6$ are formed with strongly tapering portions $a^8$.

Preferably in all the examples the thickness of the portion $a$, $a^3$ and $a^6$ exceeds the breadth of the characters, as is shown in Fig. 6.

In Fig. 7 I have illustrated the manner of mounting the electrodes so that they do not displace the type block and lever which have adjusted on the gauge $b$. As shown, the said electrodes $d$, $d$ are mounted through insulating bushings $h$ in a pair of tongs $g$ which are adapted to be opened and closed by suitable means such for example as a clamping screw $i$ having right hand and left hand screw threads. The tongs are suspended by means of a flexible member such as a chain or rope $k$ so as to be freely movable relatively to the type block $a$ and the lever $c$ without displacing the same from its adjusted position. The current is supplied to the electrodes $d$, $d$ by means of flexible leads $m$.

I claim:

The method herein described of welding a type-block, having a tempered character-bearing anterior face and having a rearward-extending stem, to a type-bar, without impairing the hardness of said character-bearing face of the type-block, which consists in clamping the body of said type-block, at a point intermediate its character-bearing face and its stem, between and in thermal communication with two members of high heat conductivity, with the stem of the block secured in position against said type-bar, applying welding heat to the stem of the type-block and type-bar while diverting heat that would otherwise flow from the stem to the character-bearing face of the type-block through the bodies of said members of high heat conductivity.

ERICH MEISNER.